(12) United States Patent
Webster et al.

(10) Patent No.: US 11,676,211 B2
(45) Date of Patent: *Jun. 13, 2023

(54) AUTOMATIC LIFE PLANNING AND EXECUTION BASED ON PERSONAL GOALS

(71) Applicant: BlueOwl, LLC, San Francisco, CA (US)

(72) Inventors: Eric Webster, Bloomington, IL (US); Susan Beigie, Bloomington, IL (US); Kyle Schmitt, El Paso, IL (US); Leif Agerholm Roll, Bloomington, IL (US); Kathleen Lenzini, Bloomington, IL (US); Sarah Mineau, Normal, IL (US)

(73) Assignee: BLUEOWL, LLC, San Francisco, CA (US)

(*) Notice: Subject to any disclaimer, the term of this patent is extended or adjusted under 35 U.S.C. 154(b) by 119 days.

This patent is subject to a terminal disclaimer.

(21) Appl. No.: 17/213,609

(22) Filed: Mar. 26, 2021

(65) Prior Publication Data
US 2021/0217092 A1   Jul. 15, 2021

Related U.S. Application Data

(63) Continuation of application No. 15/975,476, filed on May 9, 2018, now Pat. No. 10,997,660.

(60) Provisional application No. 62/506,874, filed on May 16, 2017.

(51) Int. Cl.
*G06Q 40/06* (2012.01)
*H04L 67/306* (2022.01)
*G06Q 40/02* (2023.01)

(52) U.S. Cl.
CPC ............ *G06Q 40/06* (2013.01); *G06Q 40/02* (2013.01); *H04L 67/306* (2013.01)

(58) Field of Classification Search
CPC ....... G06Q 40/06; G06Q 40/02; H04L 67/306
See application file for complete search history.

(56) References Cited

U.S. PATENT DOCUMENTS

| | | |
|---|---|---|
| 5,608,620 A | 3/1997 | Lundgren |
| 2004/0172357 A1* | 9/2004 | Padgette ............... G06Q 40/08 705/36 R |
| 2006/0195816 A1 | 8/2006 | Grandcolas et al. |
| 2009/0281959 A1 | 11/2009 | Abidi et al. |
| 2014/0074688 A1 | 3/2014 | Shvarts et al. |

(Continued)

*Primary Examiner* — Scott C Anderson
(74) *Attorney, Agent, or Firm* — Faegre Drinker Biddle & Reath LLP

(57) ABSTRACT

Techniques are disclosed to calculate a "life script." The life script may include various behaviors and/or monetary allocations required for a user to meet one or more user-defined objectives. These objectives may indicate various lifestyle habits desired by the user such as where to live, a maximum commuting time to work, how often to travel, etc. Because each of these objectives requires the user to allocate his funds in a certain way and to live in accordance with a particular set of restraints, user information may be collected and aggregated from several sources to generate a user profile indicating the user's financial information, demographics, psychographics, and lifestyle information. The user profile may then be analyzed to calculate a constraint framework that guides the generation of a life script to allow the user to achieve the desired objectives.

20 Claims, 8 Drawing Sheets

(56) References Cited

U.S. PATENT DOCUMENTS

| | | |
|---|---|---|
| 2014/0289262 A1* | 9/2014 | Hasegawa ............. G06F 16/284 |
| | | 707/752 |
| 2014/0335497 A1 | 11/2014 | Gal et al. |
| 2015/0161733 A1* | 6/2015 | Emsbo-Mattingly ........................ |
| | | G06Q 40/06 |
| | | 705/36 R |
| 2015/0364057 A1* | 12/2015 | Catani .................... G16H 10/60 |
| | | 434/262 |
| 2016/0012538 A1 | 1/2016 | Costaceque-Cecchi-Dimeglio et al. |
| 2018/0089676 A1 | 3/2018 | Narasimhan et al. |

* cited by examiner

400

| User A | Weighted importance (5 = most important; 1 = least important) | | | | |
|---|---|---|---|---|---|
| Objective | | | | | |
| Buy a new car within the next 2 years | 1 | | | | |
| Buy a house within the next 5 years | | | | | 5 |
| Attend Oktoberfest in Munich next year | | | | 4 | |
| Travel internationally at least once every 3 years | | | | 4 | |
| Dine out 3 times a week | | | 3 | | |
| Live in a good school district | 1 | | | | |
| Always own the most recent iteration of a specific smartphone | | 2 | | | |
| Always have a commute less than 30 minutes | | | | | 5 |
| Always live in an urban environment | | | | | 5 |
| Always live within 50 miles of a specific address | | | 3 | | |
| Always dress fashionably | | 2 | | | |
| Maintain retirement contributions to retire at 65 | | | | 4 | |
| Work 40 hours per week or less | | | | | 5 |
| Obtain a new life insurance policy | | | 3 | | |
| Obtain line of credit for $25,000 | | | 3 | | |
| Obtain health insurance | | | | 4 | |

FIG. 4A

| User B | Weighted importance (5 = most important; 1 = least important) | | | | |
|---|---|---|---|---|---|
| Objective | | | | | |
| Buy a new car within the next 2 years | | | | | 5 |
| Buy a house within the next 5 years | 1 | | | | |
| Attend Bonnaroo Music Festival next year | | | | | 5 |
| Travel internationally at least once every 2 years | | | 3 | 4 | |
| Dine out 3 times a week | | | | 4 | |
| Live in a good school district | | 2 | | | |
| Always own the most recent iteration of a specific smartphone | | 2 | | | |
| Always have a commute less than 30 minutes | | | 3 | | |
| Always live in an urban environment | | 2 | | | |
| Always live within 25 miles of a specific address | | | | | 5 |
| Always dress fashionably | | | | | 5 |
| Maintain retirement contributions to retire at 65 | | | 3 | | |
| Work 40 hours per week or less | | 2 | | | |
| Obtain property insurance | | | 3 | | |
| Obtain health insurance for entire family | | | | 4 | |

AUTOMATIC LIFE PLANNING AND EXECUTION BASED ON PERSONAL GOALS

CROSS REFERENCE TO RELATED APPLICATIONS

This application is a continuation of, and claims the benefit of U.S. patent application Ser. No. 15/975,476, filed May 9, 2018, which claims the benefit of U.S. Provisional Patent Application No. 62/506,874, entitled "Automatic Life Planning and Execution Based on Personal Goals," filed May 16, 2017, the disclosures of which are hereby expressly incorporated by reference herein in their entirety.

TECHNICAL FIELD

The present disclosure relates to the calculation of scripts and, more particular, the calculation of scripts that allow users to meet one or more user-defined objectives.

BACKGROUND

Traditionally, to obtain advice regarding how to achieve certain life goals, people often speak in person to various financial advisors, family members, friends, etc. In doing so, a user may receive different types of advice or consult different sources for information regarding how to handle finances or modify existing behaviors. However, each person or source typically provides only a specific type of advice, and therefore the individual must consider advice from several different sources and attempt to effectuate an action plan, which may be arduous, time-consuming, and require a level of high level of financial expertise. Similarly, online budgeting tools may allow users to plan a budget, but only address specific monetary needs, and do not consider combinations of user behaviors, monetary allocations, or other actions required by the user to meet a plethora of objectives. Existing tools may have other drawbacks.

BRIEF SUMMARY

The present embodiments may provide advice to achieve certain life goals, and perform analysis needed for a real-world life script. The life script may indicate a combination of user behavior, monetary contributions, and/or allocations over time that are required to achieve a combination of overall life goals.

In one aspect, a computer-implemented method for implementing a comprehensive life planner may be provided. The method may include one or more processors (1) aggregating financial information, demographic information, lifestyle information, and psychographic information associated with a user to generate a user profile; (2) receiving a plurality of objectives indicating desired recurring lifestyle habits as identified by the user; (3) calculating a constraint framework for the user in accordance with the user profile that indicates one or more constraints used to identify how to achieve the plurality of objectives; (4) receiving a weighted importance associated with each of the plurality of objectives, the weighted importance indicating how important it is for the user to achieve each of the plurality of objectives compared to the others; (5) calculating, or generating, a script that indicates user behavior, contributions, and allocations required to achieve one or more of the plurality of objectives, in order of weighted importance, in accordance with the constraint framework; and/or (6) transmitting the script to an electronic device for presentation to the user to facilitate comprehensive life planning based upon user-specific objectives or goals. The method may include additional, less, or alternate actions, including those discussed elsewhere herein In yet another aspect, a system for implementing a comprehensive life planner may be provided. The system may include (1) one or more back-end components configured to (i) aggregate financial information, demographic information, lifestyle information, and psychographic information associated with a user to generate a user profile; (ii) receive a plurality of objectives indicating desired lifestyle habits as identified by the user; (iii) calculate a constraint framework for the user in accordance with the user profile that indicates one or more constraints used to identify how to achieve the plurality of objectives; (iv) receive a weighted importance associated with each of the plurality of objectives, the weighted importance indicating how important it is for the user to achieve each of the plurality of objectives compared to the others; and/or (v) calculate or generate a script that indicates user behavior, contributions, and allocations required to achieve one or more of the plurality of objectives, in order of weighted importance, in accordance with the constraint framework; and/or (2) a client device configured to receive the script transmitted by the one or more back-end components and to display the script to the user to facilitate comprehensive life planning based upon user-specific objectives. The system may include additional, less, or alternate components, including those discussed elsewhere herein In still another aspect, a non-transitory computer readable medium having instructions stored thereon may be provided. The instructions may, when executed by one or more processors, cause the one or more processors to (1) aggregate financial information, demographic information, lifestyle information, and psychographic information associated with a user to generate a user profile; (2) receive a plurality of objectives indicating desired lifestyle habits as identified by the user; (3) calculate a constraint framework for the user in accordance with the user profile that indicates one or more constraints used to identify how to achieve the plurality of objectives; (4) receive a weighted importance associated with each of the plurality of objectives, the weighted importance indicating how important it is for the user to achieve each of the plurality of objectives compared to the others; (5) calculate or generate a script that indicates user behavior, contributions, and allocations required to achieve one or more of the plurality of objectives, in order of weighted importance, in accordance with the constraint framework; and/or (6) transmit the script to an electronic device for presentation to the user to facilitate comprehensive life planning based upon user-specific objectives. The non-transitory computer readable medium may include additional, less, or alternate instructions, including those discussed elsewhere herein.

Advantages will become more apparent to those of ordinary skill in the art from the following description of the preferred aspects which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF DRAWINGS

FIGS. 4A-4B illustrate exemplary user-defined objectives 400 and 450, respectively, in accordance with aspects of the present disclosure;

Figure 1:
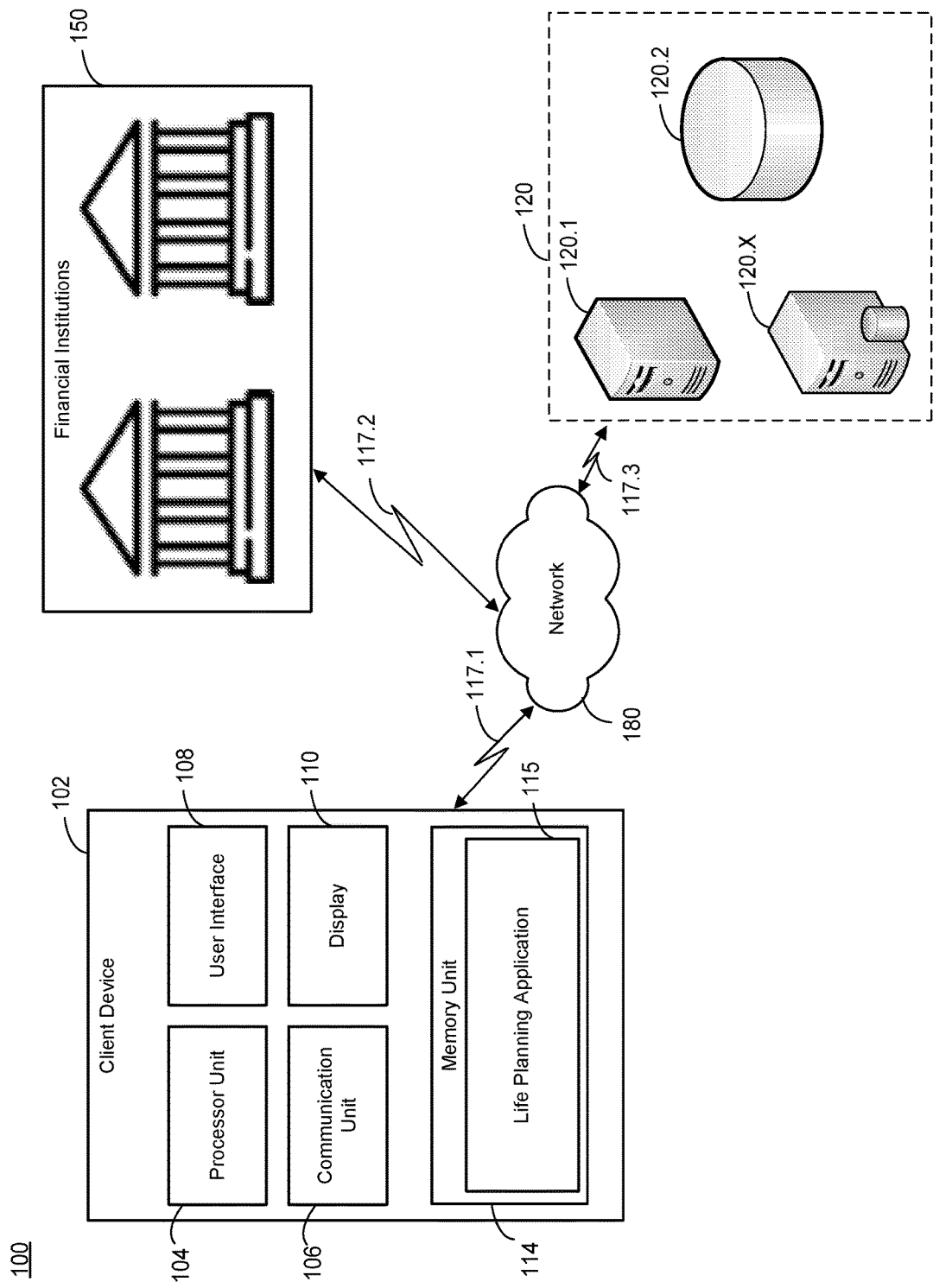
FIG. 1 illustrates a block diagram of an exemplary comprehensive life planner system 100, in accordance with aspects of the present disclosure.

The Figures depict aspects of the present invention for purposes of illustration only. One skilled in the art will readily recognize from the following discussion that alternate aspects of the structures and methods illustrated herein may be employed without departing from the principles of the invention described herein.

DETAILED DESCRIPTION

Conventional financial service products may be designed to solve specific, narrow goals, such as financing a house, paying off credit cards, or establishing a monthly budget. Therefore, consumers that want to determine how to achieve a lifestyle that addresses an amalgamation of current and/or future financial, behavioral, and social needs such as buying a home, living a particular lifestyle, reducing their commute, traveling to a specific destination next year, etc., may be forced to create a mix of behaviors, spending patterns, and products they hope will accomplish their goals. However, this may require implementing a number of limited products and behavioral changes, and no product is "aware" of its role in achieving the consumer's overall goal. As a result, every consumer is forced to become a financial expert to perform an undue amount of research and analysis, which most fail to do so.

To remedy this, the present aspects relate to, inter alia, calculating a comprehensive "life script" to allow a user to achieve various pre-defined objectives. These objectives may include, for example, a user's preferences regarding how often to travel, where to travel, where to live, how often to upgrade to a new smartphone, when to pay off debts, if and when to make a large purchase such as a home or vehicle, etc. A user's life objectives may therefore be defined by the user, and include an outline of various lifestyle preferences, and the relative importance of each compared to others.

Aspects of the present embodiments may include gathering data for a particular user such as demographics, psychographics, financial information, lifestyle information, debts, assets, recurring expenses, a maximum level of risk, answers to information solicited from the user, etc. One or more portions of this data (and the user's life objectives) may then be aggregated and stored as a user profile. To determine the user's life-script, a constraint framework may be calculated that determines precisely if and how the user may achieve her defined objectives, considering their relative importance in doing so. In other words, the constraint framework may represent a mathematical construct that defines several means of the user achieving her defined objectives, and may be calculated from a combination of factors such as data stored in the user's profile, the importance of achieving other objectives, and guidelines that are established by translating various objectives into a monetary value.

By applying the constraint framework, the generated life script may indicate various behaviors and/or monetary allocations required for a user to meet his objectives. The life script may be calculated, for example, by determining how the most important objectives can first be achieved. In the event that all of a user's life objectives cannot be achieved, aspects include the life script suggesting various alternatives. This may include, for example, determining alternatives and requesting, from the user, whether any of these alternatives are acceptable. In this way, the aspects disclosed herein describe a dynamic and comprehensive life planning tool, which actively analyzes life objectives and provides alternatives as needed to allow a user to optimize his overall lifestyle in a way that is best suited to him as set out in by his indication of each objective's importance.

System Overview

FIG. 1 illustrates a block diagram of an exemplary comprehensive life planner system 100, in accordance with certain aspects of the present disclosure. In the present aspect, comprehensive life planner system 100 may include one or more client devices 102, one or more back-end computing devices 120, one or more financial institutions 150, and/or a communication network 180. Comprehensive life planner system 100 may further include any suitable number X of back-end computing devices 120, which may include back-end computing devices 120.1-120.X, for example. Comprehensive life planner system 100 may include additional, less, or alternate components, including those discussed elsewhere herein.

For the sake of brevity, comprehensive life planner system 100 is illustrated as including a single client device 102, three back-end computing devices 120, two financial institutions 150, and a single communication network 180. However, the aspects described herein may include any suitable number of such components. For example, back-end computing devices 120 may include several hundred components, including a server configured to communicate with several client devices 102, each of which may be operated by a separate user. Moreover, several back-end computing devices 120 may receive data from each separate client device 102, from several financial institutions 150, and/or transmit data to each separate client device 102 and several financial institutions 150, as further discussed herein.

To provide another example, one or more of back-end computing devices 120 may receive data from one or more client devices 102 such that a user profile for each user may include data received from each user's respective client device. To provide yet another example, client device 102 may represent one client device from several different client devices for the same user or for different users. For example, client device 102 may represent a user's smartphone as well as a user's desktop computer, each of which may collect and transmit data to one or more financial institutions 150 and/or one or more back-end computing devices 120, as further discussed below.

Communication network 180 may be configured to facilitate communications between one or more client devices 102, one or more financial institutions 150, and/or one or more back-end computing devices 120 using any suitable number of wired and/or wireless links, which may be represented as links 117.1-117.3, for example. For example, communication network 180 may include any suitable number of nodes, radio frequency links, wireless or digital communication channels, additional wired and/or wireless networks that may facilitate one or more landline connections, internet service provider (ISP) backbone connections, satellite links, public switched telephone network (PSTN), etc.

To provide additional examples, the present aspects include communication network 180 being implemented, for example, as a local area network (LAN), a metropolitan area network (MAN), a wide area network (WAN), or any suitable combination of local and/or external network connections. To provide further examples, communications network 180 may include wired telephone and cable hardware, satellite, cellular phone communication networks, base stations, macrocells, femtocells, etc. In the present aspects, communication network 180 may provide one or more client devices 102 with connectivity to network services, such as Internet services, for example, and/or support application programming interface (API) calls between one or more client devices 102, one or more financial institutions 150, and/or one or more back-end computing devices 120.

One or more financial institutions 150 may include any suitable number and/or type of financial institutions that hold and/or are associated with various financial accounts. For example, one or more financial institutions 150 may include banks, creditors, lenders, and/or brokers. One or more users (e.g., a user associated with client device 102) may hold one or more accounts with one or more financial institutions 150 such as checking accounts, savings accounts, credit accounts, lines of credit, loan accounts, charge accounts, money market accounts, brokerage accounts, etc. These accounts may be held at a single institution or spread out across several different financial institutions.

In one aspect, financial accounts held at one or more financial institutions 150 may be accessible via a secure connection to communication network 180, for example, by client device 102 and/or one or more back-end computing devices 120. For example, one or more financial institutions 150 may provide online services that allow a user to access her accounts using client device 102 and/or another suitable computing device. Upon receipt of a valid authenticated request for financial data, one or more financial institutions 150 may transmit financial data to client device 102 and/or one or more back-end computing devices 120. Examples of the financial data transmitted by one or more financial institutions 150 may include financial transaction data indicating previous credits and debits to a user's accounts, a current account balance, loan payoff balances, credit report history, credit scores, credit card utilization, derogatory credit marks, spending data such as the time, amount, and specific merchant for which previous account debits and/or charges were made, whether the user has previously defaulted on a particular loan, etc.

In various aspects, back-end computing devices 120 may include any suitable number of back-end components, which may include any suitable type of components configured to receive, send, store, and/or analyze data to facilitate the performance of the functions of the various embodiments as described herein. For example, as shown in FIG. 1, back-end computing devices 120 may include one or more life script calculation engines 120.1, one or more databases 120.2, and/or one or more database servers 120.X.

In the present aspects, life script calculation engine 120.1 may be configured to access data from and/or store data to one or more additional data sources that may be included as one or more of back-end computing devices 120. These data sources may provide data that is utilized by life script calculation engines 120.1 for various purposes. For example, life script calculation engine 120.1 may use this data to generate a user profile, determine a constraint framework, and to calculate a life script in accordance with the constraint framework for a particular user. To provide another example, life script calculation engine 120.1 may additionally or alternatively use data obtained in this manner to facilitate a user effectuating one or more actions in accordance with a calculated life script, as further discussed herein.

For example, as shown in FIG. 1, the data sources included as part of the one or more back-end computing devices 120 may include data retrieved from third-party data providers that may not be readily obtained from the user (e.g., via communications with client device 102), and/or from the financial instructions 150. For example, the additional data sources may include data provided by one or more third-party data providers and include information such as, for example, data mined from social media, data provided by various retailers, income levels of various users, financial information, psychographic information, demographic information, lifestyle information, assets associated with various users, loan information associated with various users, etc.

Therefore, in various aspects, life script calculation engine 120.1 may use any suitable combination of data from these additional data sources that are part of the one or more back-end computing devices 120, data provided by a user and/or the client device 102, and/or data accessed via the one or more financial instructions 150 to generate a unique user profile for a particular user. This data may be referred to herein as "life script data," and include, for example, a user's financial information, demographic information, lifestyle information, and psychographic information, among other suitable types of data.

Thus, the life script data may include, for example, any suitable type of information that is relevant to the calculation of a constraint framework and a corresponding life script for a particular user. For example, a user's financial information may include data such as credit report information, checking and savings account balance information, investment account information, retirement account information, a user's net worth, a user's (or a family's) income (e.g., based on any suitable time period such as annually, bi-weekly, monthly, etc.), a user's tax bracket, assets, monthly expenses, loan payment information, credit scores, etc.

Similarly, a user's demographic information may include any suitable type of information that is relevant to the calculation of a constraint framework and a corresponding life script for a particular user. Therefore, the demographic information may include, for example, a user's age or age bracket, gender, marital status, household size, name and address, a particular defined demographic region where the user currently lives (e.g., a city, state, zip code, county, etc.), whether the user has any children, ethnicity, total household income, languages spoken, whether the user owns a home, whether the user rents, level of education, employment status, number and type of vehicles (or other assets) owned, where the user works, etc.

Moreover, a user's psychographic information may include any suitable type of information that is relevant to the calculation of a constraint framework and a corresponding life script for a particular user. Therefore, the psychographic information may include, for example, a level of risk tolerance in general and/or for various specific objectives, whether the user is generally concerned with health and appearance (and if so, and indicator of how much), whether the user prefers a healthy lifestyle but doesn't have much time, whether the user enjoys going out or online in the evenings, whether the user follows several social networking sites and, if so, which ones, whether the user tends to favor quality over economy, whether the user finds fulfillment in her career and family, whether the user is generally "family oriented," whether the user values time with a small group of friends, etc.

Furthermore, a user's lifestyle information may include any suitable type of information that is relevant to the calculation of a constraint framework and a corresponding life script for a particular user. Therefore, the lifestyle information may include, for example, patterns of the user cooking at home vs. eating out, spending habits, preferred clothing styles (e.g., whether a user prefers to dress fashionably regardless of the additional cost), the user's electronic device usage and preferences (e.g., whether the user prefers Apple products, windows devices, android devices, etc.), a user's preferred maximum commuting time, a preferred mode of commuting to work or traveling, a preferred region where to live, a preference to rent or own, etc.

It is to be understood that the data described above is introduced to provide several specific examples, and is not meant to be exhaustive or limiting. Furthermore, it is to be understood that certain types of data may be classified under more than one of the aforementioned categories of financial information, demographic information, psychographic information, and lifestyle information. Thus, these categories are likewise listed for ease of explanation and not by way of limitation. Again, the life script data may include any suitable relevant information from which a user's life script may be ultimately determined.

In an aspect, life script calculation engine 120.1 may be implemented as any suitable number and/or type of computing device (e.g., one or more computer servers) that is configured to communicate with other various components such as other back-end components 120.2-120.X, one or more client devices 102, and/or one or financial institutions 150. In various embodiments, life script calculation engine 120.1 may be configured to process application programming interface (API) service calls, to support one or more applications installed on one or more client devices 102, to aggregate data from one or more sources to generate and store a user profile, to receive objectives and a relative importance of each from a user, to calculate constraint frameworks, to execute the constraint frameworks to determine which objectives are achievable, to suggest alternative objectives, to monitor financial activity associated with a user and/or via communication with one or more financial institutions 150, etc., the details of which are further discussed below.

Furthermore, the aspects described herein allocate the calculations and functionality for determining a life script primarily with life script calculation engine 120.1 for ease of explanation. However, aspects include life script calculation engine 120.1 working in conjunction with any suitable number of other components of comprehensive life planner system 100 to facilitate the functionality associated with the aspects of the disclosure as described herein. For example, life script calculation engine 120.1 may work in conjunction with other servers, databases, cloud-based servers, etc., included as part of the one or more back-end computing devices 120. To provide another example, life script calculation engine 120.1 may work in conjunction with client device 102. Additionally or alternatively, one or more functions described herein with respect to life script calculation engine 120.1 may also be performed via one or more client devices 102, which similarly may work in conjunction with work one or more of back-end computing devices 120.

Database 102.2 may include one or more storage devices configured to store, delete, update, and/or modify data in accordance with one or more commands received from one or more other back-end components 120, one or more client devices 102, and/or one or more financial institutions 150. For example, database 120.2 may include any suitable combination of one or more storage mediums such as hard disk drives, solid state memory, cloud-based storage devices, etc. In various aspects, database 120.2 may store data in addition to or instead of data stored locally by life script calculation engine 120.1. In doing so, life script calculation engine 120.1, database 120.2, and/or other back-end components 120 may store any suitable type of data used to facilitate the various functionalities of the aspects as described herein. Examples of the data stored among the various components of one or more back-end components 120 include user profiles, user-defined objectives, constraint framework data, executable code, algorithms, instructions, etc., used to execute various life script calculations as discussed herein, etc. Moreover, data stored in database 120.2 (and/or one or more other back-end components 120) may be accessed via client device 102 and/or the one or more financial institutions 150 as needed.

In some aspects, data stored in database 120.2 (and/or one or more other back-end components 120) may include private or confidential information such as financial records, credit report information, insurance-related information, etc. Thus, aspects include utilizing secure data storage and access procedures when data is written to or retrieved from database 120.2 (and/or one or more other back-end components 120) via life script calculation engine 120.1. These procedures may include, for example, secure login and authentication procedures and/or the encryption of data stored in database 120.2 (and/or one or more other back-end components 120).

Database server 120.X may be configured as any suitable number and/or type of server, and may be configured to perform substantially similar functions as life script calculation engine 120.1. In some embodiments, life script calculation engine 120.1 and database server 120.X may be implemented as a single device, and thus both life script calculation engine 120.1 and database server 120.X may not be present in some aspects. But in other aspects, database server 120.X may perform dedicated database operations, while life script calculation engine 120.1 performs communication and analytical-based functions.

For example, life script calculation engine 120.1 may handle communications with client computing devices 102, one or more financial institutions 150, and/or one or more other back-end components 120, and perform calculations related to the calculation of constraint frameworks, the calculation of life scripts, etc. Continuing this example, in such a case database server 120.X may facilitate the receipt of information, the aggregation of data, and the generation of user profiles. For example, as new information is received for a particular user over time, data base server 120.X (or other back-end components 120 such as life script calculation engine 120.1) may append, substitute, update, or otherwise modify the user's profile so that it remains up-to-date over time.

To provide another example, database 120.2 (and/or one or more other back-end components 120) may store user information, logon credentials, and contact information for one or more users. Life script calculation engine 120.1 may access data stored in database 120.2 (and/or one or more other back-end components 120) to correlate data received from various data sources to a particular user's profile for data aggregation and/or to facilitate the transmission of a calculated life script to a particular user.

In the present aspects, client device 102 may include a processor unit 104, a communication unit 106, a user interface 108, a display 110, and a memory unit 114. Client device 102 may include additional, less, or alternate components, including those discussed elsewhere herein. In various aspects, client device 102 may be implemented as any suitable computing device configured to receive user input, display information, and/or communicate with other components of comprehensive life planner system 100. For example, client device 102 may be implemented as a smartphone or other suitable mobile computing device. To provide additional examples, client device 102 may be implemented as a personal digital assistant (PDA), a desktop computer, a tablet computer, a laptop computer, a phablet, GNSS-enabled devices, smart watches, smart glasses, smart bracelets, wearable electronics, pagers, computing devices configured for wireless communication, etc.

Client device 102 may be configured to communicate using any suitable number and/or type of communication protocols, such as Wi-Fi, cellular, BLUETOOTH, NFC, RFID, Internet Protocols, etc. For example, client device 102 may be configured to communicate with communication network 180 using a cellular communication protocol to send data to and/or receive data from the one or more financial institutions 150 and/or the one or more back-end computing devices 120 via communication network 180 using one or more communication links, such as links 117.1-117.3, for example.

To this end, communication unit 106 may be configured to facilitate data communications between client device 102 and one or more of communication network 180, one or more financial institutions 150, and/or one or more back-end computing devices 120 in accordance with any suitable number and/or type of communication protocols. In the present aspects, communication unit 106 may be configured to facilitate data communications based upon the particular component and/or network with which client device 102 is communicating.

Such communications may facilitate the transmission of collected data from client device 102 that is utilized by life script calculation engine 120.1 to generate a user profile, calculate a constraint framework, generate life scripts, etc., as further discussed herein. In the present aspects, communication unit 106 may be implemented with any suitable combination of hardware and/or software to facilitate this functionality. For example, communication unit 106 may be implemented with any suitable number of wired and/or wireless transceivers, network interfaces, physical layers (PHY), ports, antennas, etc.

User interface 108 may be configured to facilitate user interaction with client device 102. For example, user interface 108 may include a user-input device such as an interactive portion of display 110 (e.g., a "soft" keyboard displayed on display 110), an external hardware keyboard configured to communicate with client device 102 via a wired or a wireless connection (e.g., a BLUETOOTH keyboard), an external mouse, or any other suitable user-input device.

Display 110 may be implemented as any suitable type of display that may facilitate user interaction, such as a capacitive touch screen display, a resistive touch screen display, etc. In various aspects, display 110 may be configured to work in conjunction with user-interface 108 and/or processor unit 104 to detect user inputs upon a user selecting a displayed interactive icon or other graphic, to identify user selections of objects displayed via display 110, to display notifications regarding available calculated life scripts transmitted by life script calculation engine 120.1, to display one or more links allowing a user to directly effectuate changes described in the life script, which may be received, for example, via life script calculation engine 120.1, etc.

Processor unit 104 may be implemented as any suitable type and/or number of processors, such as a host processor for the relevant device in which client device 102 is implemented, for example. Processor unit 104 may be configured to communicate with one or more of communication unit 106, user interface 108, display 110, and/or memory unit 114 to send data to and/or to receive data from one or more of these components.

For example, processor unit 104 may be configured to communicate with memory unit 114 to store data to and/or to read data from memory unit 114. In accordance with various embodiments, memory unit 114 may be a computer-readable non-transitory storage device, and may include any suitable combination of volatile (e.g., a random access memory (RAM)), or non-volatile memory (e.g., battery-backed RAM, FLASH, etc.). In the present aspects, memory unit 114 may be configured to store instructions executable by processor unit 104. These instructions may include machine readable instructions that, when executed by processor unit 104, cause processor unit 104 to perform various acts.

In the present aspects, life planning application 115 is a portion of memory unit 114 configured to store instructions, that when executed by processor unit 104, cause processor unit 104 to perform various acts in accordance with applicable aspects as described herein. For example, instructions stored in life planning application 115 may facilitate processor unit 104 performing functions such as periodically reporting and/or transmitting the location of client device 102 as part of a running background process, collecting various types of data, sending various types of data to one or more financial institutions 150 and/or life script calculation engine 102.1, receiving data and/or notifications from one or more financial institutions 150 and/or life script calculation engine 120.1, receiving user input that defines various objectives and the respective importance of each, receiving user input including information solicited from the user that may be used to generate a user profile and/or further define a user's life objectives, displaying notifications, interactive links, and/or other information using data received via one or more financial institutions 150 and/or life script calculation engine 120.1, etc.

In some aspects, life planning application 115 may reside in memory unit 114 as a default application bundle that may be included as part of the operating system (OS) utilized by client device 102. But in other aspects, life planning application 115 may be installed on client device 102 as one or more downloads, such as an executable package installation file downloaded from a suitable application source via a connection to the Internet or other suitable device, network, external memory storage device, etc.

For example, life planning application 115 may be stored in any suitable portions of memory unit 114 upon installation of a package file downloaded in such a manner. Examples of package download files may include downloads via the iTunes store, the Google Play Store, the Windows Phone Store, a package installation file downloaded from another computing device, etc. Once downloaded, life planning application 115 may be installed on client device 102 as part of an installation package such that, upon installation of life planning application 115, memory unit 114 may store executable instructions such that, when executed by processor unit 104, cause client device 102 to implement the various functions of the aspects as described herein.

In aspects, via the use of life planning application 115 (or other suitable component(s) of client device 102), the user may begin the process of creating a user profile. This may be implemented, for example, upon first launching life planning application 115, through a registration process via a website, via direct or indirect communication with life script calculation engine 120.1 (which may also be in the form of Internet communications or via interaction with various supported websites), over the phone, etc. This user profile may therefore initially include, for example, device information, contact information, a user ID, or any other suitable information that may allow client device 102, financial institutions 150, and/or one or more back-end components 120 to later correlate a user to his user profile. For example, upon installing and launching life planning application 115 on client device 102, a user may be prompted to enter login information and/or complete an initial registration process to create an initial user profile, which may subsequently be modified via life script calculation engine 120.1 (and/or one or more other back-end components 120).

Exemplary Life Script Calculation Engine

Figure 2:
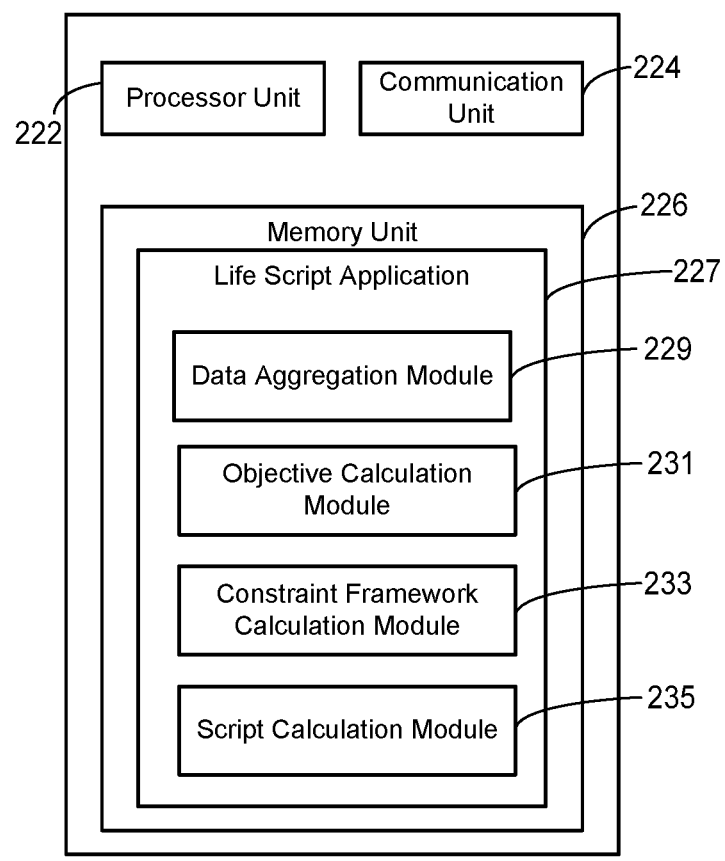
FIG. 2 illustrates a block diagram of an exemplary life script calculation engine 200, in accordance with aspects of the present disclosure.

FIG. 2 illustrates a block diagram of an exemplary life script calculation engine 200, in accordance with aspects of the present disclosure. In one aspect, life script calculation engine 200 may be an implementation of life script calculation engine 120.1, as shown and discussed with respect to FIG. 1. In the present aspects, life script calculation engine 200 may include a processor unit 222, a communication unit 224, and a memory unit 226. Life script calculation engine 200 may include additional, less, or alternate components, including those discussed elsewhere herein.

It should be noted that, although only a life script calculation engine 200 is shown in FIG. 2, this is only one of many aspects. In some aspects, multiple computing devices, servers, etc., may be configured to have a logical presence of a single entity, such as a server bank or an arrangement known as "cloud computing," for example. These configurations may provide various advantages, such as enabling near real-time uploads and downloads of information as well as periodic uploads and downloads of information. However, for ease of discussion and not limitation, the life script calculation engine 200 is referred to herein using the singular tense.

Life script calculation engine 200 may be configured to communicate using any suitable number and/or type of communication protocols, such as Wi-Fi, cellular, BLUETOOTH, NFC, RFID, Internet Protocols, etc. For example, the life script calculation engine 200 may be configured to communicate via wireless communication or data transmission over one or more radio frequency links or communication channels, and/or communicate with one or more communication networks (e.g., communication network 180) using a cellular communication protocol to send data to and/or receive data from one or more financial institutions (e.g., one or more financial institutions 150), one or more back-end computing devices (e.g., one or more back-end computing devices 120), and/or one or more client devices 102 (e.g., client device 102) via such communications.

To this end, communication unit 224 may be configured to facilitate data communications between various components in accordance with any suitable number and/or type of communication protocols. In the present aspects, communication unit 224 may be configured to facilitate data communications based upon the particular component and/or network with which life script calculation engine 200 is communicating.

Again, such communications may facilitate the transmission of collected data from one or more financial institutions, one or more back-end computing devices, and/or one or more client devices 102 that is utilized by life script calculation engine 200 to generate a user profile, calculate a constraint framework, generate life scripts, etc., as further discussed herein. In the present aspects, communication unit 224 may be implemented with any suitable combination of hardware and/or software to facilitate this functionality. For example, communication unit 224 may be implemented with any suitable number of wired and/or wireless transceivers, network interfaces, physical layers (PHY), ports, antennas, etc.

Processor unit 222 may be implemented as any suitable type and/or number of processors, such as a host processor for the relevant device in which life script calculation engine 200 is implemented, for example. Processor unit 222 may be configured to communicate with one or more of communication unit 224 and/or memory unit 226 to send data to and/or to receive data from one or more of these components.

For example, processor unit 222 may be configured to communicate with memory unit 226 to store data to and/or to read data from memory unit 226. In accordance with various embodiments, memory unit 226 may be a computer-readable non-transitory storage device, and may include any combination of volatile (e.g., a random access memory (RAM)), or a non-volatile memory (e.g., battery-backed RAM, FLASH, etc.). In the present aspects, memory unit 226 may be configured to store instructions executable by processor unit 222. These instructions may include machine readable instructions that, when executed by processor unit 222, cause processor unit 222 to perform various acts.

In the present aspects, life script application 227 is a portion of memory unit 226 configured to store instructions, that when executed by processor unit 222, cause processor unit 222 to perform various acts in accordance with applicable aspects as described herein. For example, instructions stored in life planning application 227 may facilitate processor unit 222 executing the various functions described below with respect to each of the modules stored in memory unit 226. Some of these functions may include, for example, collecting and aggregating various types of data to generate user profiles, defining various life objectives for one or more users, communicating with one or more financial institutions and/or client devices, communicating with one or more back-end computing devices, calculating constraint frameworks, calculating life scripts, transmitting life scripts to users via their respective client devices, etc. These functions are further discussed below with respect to the each of the additional modules stored in memory unit 226.

Thus, some aspects include life script application 227, data aggregation module 229, objective calculation module 231, constraint framework calculation module 233, and script calculation module 235 being implemented as one or more software applications, sets of computer-executable instructions, algorithms, etc., which are stored on the memory unit 226 and executable by the processor unit 222. For example, memory unit 226 may represent a tangible, non-transitory computer-readable medium, with each of life script application 227, data aggregation module 229, objective calculation module 231, constraint framework calculation module 233, and script calculation module 235 including instructions executable by one or more processors (e.g., processor unit 222) that, when executed by the one or more processors, cause the one or more processors to perform various acts as described herein. To provide another example, the life script application 227, data aggregation module 229, objective calculation module 231, constraint framework calculation module 233, and script calculation module 235 may be implemented at least partially in firmware and/or in hardware of the life script calculation engine 200.

The various applications and modules shown in FIG. 2 and discussed herein may be executed on the same processing unit 222 or on different computer processors (which may also be part of separate components not pictured in FIG. 2) in some aspects, as desired. Further, while the life script application 227, data aggregation module 229, objective calculation module 231, constraint framework calculation module 233, and script calculation module 235 are depicted as separate components of memory unit 226, two or more of these components may be integrated into different integrated applications and/or integrated modules. Moreover, one or more of the life script application 227, data aggregation module 229, objective calculation module 231, constraint framework calculation module 233, and script calculation module 235 may be implemented in conjunction with other application (not shown) that are stored and executed via the life script calculation engine 200 and/or other components in communication with life script calculation engine 200.

In the present aspects, data aggregation module 229 is a portion of memory unit 226 configured to store instructions, that when executed by processor unit 222, cause processor unit 222 to perform various acts in accordance with applicable aspects as described herein. For example, instructions stored in data aggregation module 229 may facilitate processor unit 222 performing functions associated with generating a user profile. For example, as discussed herein, data aggregation module 229 may include instruction to facilitate monitoring various data sources and/or receiving data from one or more data sources over time to build a user profile that may also change over time as new data is acquired.

Again, the data sources may include, for example, data received from one or more financial institutions (e.g., one or more financial institutions 150), one or more back-end computing devices (e.g., one or more back-end computing devices 120), and/or one or more client devices 102 (e.g., client device 102). In various aspects, this data may represent user input (e.g., via client device 102) and/or other types of data that mat be acquired with or without user input. For instance, a user may be solicited via a suitable computing device (e.g., via client device 102) in the form of survey questions, prompts, etc., for information that is then aggregated with other data included in the user's data profile. Some examples of data that may be acquired from a user in this way may include, for example, any suitable portion of financial information, demographic information, psychographic information, and/or lifestyle information as discussed herein.

Figure 3:
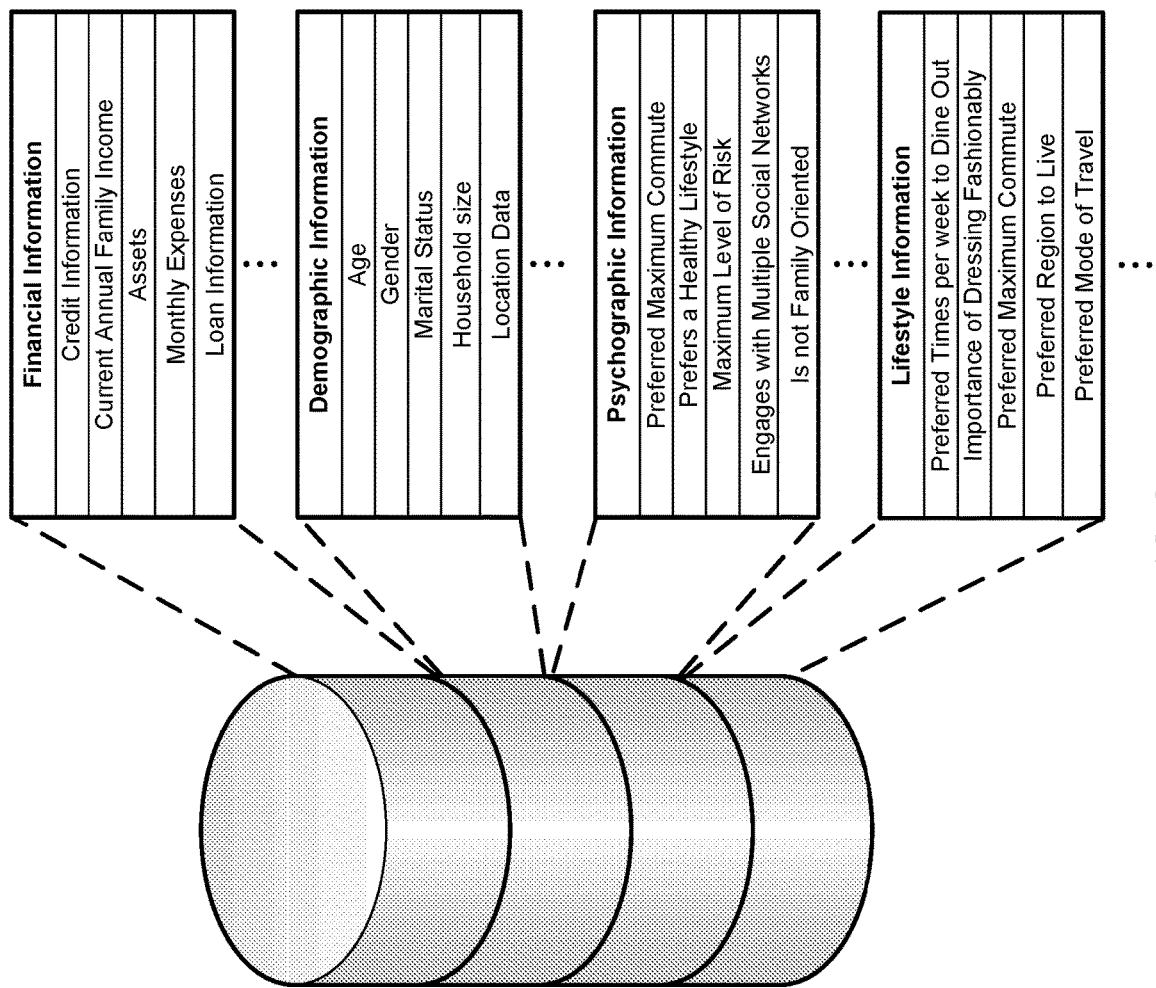
FIG. 3 illustrates exemplary information associated with a user profile 300, in accordance with aspects of the present disclosure.

To provide an illustrative example with reference to FIG. 3, which illustrates an example of information associated with a user profile 300, data aggregation module 229 may facilitate processor unit 222 (e.g., via communication unit 224) aggregating various portions of data to form a generate a user profile. This user profile may then be stored in any suitable portion of life script calculation engine 200 (e.g., memory unit 226) and/or another suitable storage device that is accessible by life script calculation engine 200 (e.g., one or more back-end components 120). It will be understood that the examples shown in FIG. 3 associated with user profile 300 such as the financial information, lifestyle information, demographic information, psychographic information, etc., are but some examples of the types of information that may be relevant to determine a life script for this particular user. This user profile may thus include, for example, any suitable number and/or type of information that is useful or otherwise relevant to calculate the user's life script.

For example, as shown in FIG. 3, the user's financial information may include data such as credit information, current annual, monthly, or bi-weekly income, a listing of all assets owned by the user, monthly expenses, information regarding current loans and loan payments, etc. Thus, the financial information may include any suitable type of information that is relevant to quantify and monetize a user's income, to determine a budget, and/or to generally determine how much a user can afford. As discussed herein, this type of information may be particularly useful to determine how many of a user's objectives may be achieved once those objectives are translated into a monetary value, when applicable.

To provide another example, as shown in FIG. 3, the user's demographic information may include the user's age (or age bracket), gender, marital status, household size, and/or location data such as the user's current address or residential region. In this way, a user's demographic information may provide various insights regarding possible alternative objectives, which may be useful when all of a user's objectives cannot be completed within the constraint framework, as discussed below. For example, the demographic information may be correlated to other users having similar demographic data and for which favorable alternative objectives can be identified. For example, market data, additional survey data, third party data, and/or feedback from other users that also utilize the life planning tool may allow a constraint framework to be generated that ensures favorable alternative objectives are presented.

To provide an illustrative example, a 25-year old single male living in an urban area may find it perfectly acceptable to put off home ownership for a longer period of time, whereas a 45-year old recently-divorced female living in a suburban area may not. In this way, the demographic information gathered from various users may help guide the calculation of each user's individual constraint framework. In doing so, life script calculation engine 200 may help guarantee each person's objectives are considered using a frame of reference of similarly-situated individuals.

To provide yet another example, user profile 300 may include a user's psychographic information, which may include a specific set of user attitudes, aspirations, hobbies, and other psychological criteria, similar to that which may ordinarily be used for market research purposes. As shown in FIG. 3, a user's psychographic information may include a preferred maximum commute, whether the user frequently visits a gym or otherwise prefers a healthy lifestyle, whether the user is generally risk-averse or willing to take on a certain level of risk (e.g., a maximum acceptable risk level threshold), whether the user is involved in various social networks (and, if so, which ones), whether the user is family oriented or more career driven, etc. Similar to the demographic information, the psychographic information may be utilized to provide alternative objectives by identifying users with similar psychographic information. Moreover, a user's psychographic information may be useful in directly setting risk thresholds that may be used in the calculation of the constraint framework, as discussed further below.

To provide an additional example, user profile 300 may include lifestyle information that indicates a user's general overall preference when living day to day, which may represent the user's preference regarding how to get to work, where to live, etc. As shown in FIG. 3, a user's lifestyle information may include a preferred number of times per week to dine out, the importance of dressing fashionably, a preferred maximum time to commute to work, a preferred region to live (e.g., urban, rural, suburban, midwest, west coast, etc.). Again, like the aforementioned demographic information and psychographic information, the lifestyle information may be utilized to provide alternative objectives by identifying users with similar psychographic information.

Thus, the information stored in the user profile may represent an overall set of data that may be referenced to calculate a constraint framework and to determine how to generate a life script for a user to best achieve his defined objectives. In various aspects, the constraint framework may utilize this information to not only determine alternative objectives, but to also determine how to balance the overall life script. For example, a user may identify several objectives having the same level of importance, as further discussed below with reference to FIGS. 4A and 4B. Therefore, when only some objectives can be accomplished, all of which have the same level of importance to the user, the information in the user profile may allow the life script calculation engine 200 to identify which of the objectives to modify by referencing data in the user's profile. In particular, the user profile may contain data specific to each of the similarly-weighted objectives. The user's defined objectives are further discussed directly below.

In the present aspects, objective calculation module 231 is a portion of memory unit 226 configured to store instructions, that when executed by processor unit 222, cause processor unit 222 to perform various acts in accordance with applicable aspects as described herein. For example, instructions stored in objective calculation module 231 may facilitate processor unit 222 performing functions associated with selecting prompts to present to a user, causing life script calculation engine 200 to transmit data to a suitable electronic device (e.g., client device 102) to solicit a user's objectives, and to receive the user's answers to these solicited requests.

For example, life script calculation engine 200 may prompt a user for various questions via any suitable means of interaction with the electronic device with which life script calculation engine 200 communicates. In this way, various aspects include a user identifying the particular objectives she wishes to use for the purposes of generating a life script. These objectives may include, for example, any suitable type of recurring, current, or future goal, habit, etc., which may be driven by the user's current, expected, and preferred lifestyle habits or changes to those lifestyle habits that are likely or certain to occur within a known time frame. For example, a user may want to purchase a home in 5 years, purchase a car in the next two years, and/or travel to a particular destination in 2 years. To provide another example, travel may be a particularly important aspect of a user's lifestyle such that the user may wish to specify recurring travel as an objective as well. To provide another example, a user may specify current or short-term objectives such as a maximum commuting time to work, owning the most recent iteration of a particular smartphone or other electronic device, working only one job, working less than 40 hours per week, etc.

To this end, FIGS. 4A-B illustrate examples of user-defined objectives 400 and 450, respectively, in accordance with aspects of the present disclosure. In one aspect, the user-defined objectives 400 and 450 shown in FIGS. 4A-B are examples of objectives and their respective weighted importance as indicated by two different users. For example, a "User A" may indicate that the most important objectives (i.e., those associated with a weight of "5") are (1) purchasing a home within the next 5 years, (2) always maintaining a commute time less than 30 minutes, (3) always living within an urban environment, and (4) working 40 hours per week or less.

A different "User B," however, has specified a different set of objectives as being the most important, including (1) purchasing a car within the next 2 years, (2) attending a particular destination for a music festival next year, (3) always living within 25 miles of a specific address, and (4) always dressing fashionably. For ease of explanation, Users A and B have identified similar objectives, but have assigned, in some case, a different weighted level of importance to these objectives. However, it will be understood that aspects include any suitable number of users identifying any suitable number of their own respective objectives and the relative importance of each one. The weighted importance of each objective may be useful when applying the constraint framework to the overall set of each user's objectives, as discussed in further detail below.

In the present aspects, constraint framework module 233 is a portion of memory unit 226 configured to store instructions, that when executed by processor unit 222, cause processor unit 222 to perform various acts in accordance with applicable aspects as described herein. For example, instructions stored in constraint framework module 233 may facilitate processor unit 222 performing functions associated with calculating a constraint framework, which is then used to determine if, how, and when a user's defined objectives can be achieved. Additionally, aspects include the constraint framework allowing life script calculation engine 200 to determine alternate objectives when all defined objectives cannot be achieved.

In various aspects, the constraint framework may be calculated based upon any suitable type and/or number of data. For example, the constraint framework may define a mathematical construct identifying various guidelines regarding how to achieve each of the user's defined objectives, and how to determine potential alternatives, in accordance with the user's profile and/'or other available information. For instance, the constraint framework may indicate an order in which objectives are attempted to be achieved based upon the indicated importance (e.g., weighting) of each objective using data accessed in the user's profile. To provide another example, the constraint framework may additionally or alternatively include logic and/or conditions used to determine how a goal is actually achieved. This may include, for example, via monetary translation of one or more objectives, by allocating portions of a user's income to accomplish each objective based upon a translated monetary value of each one, calculating optimal budgets, etc. Moreover, in various aspects, the constraint framework may be established using information that is determined from any suitable combination of data stored in the user's profile, other defined objectives, monetary thresholds specified by the user or calculated from the user's income, risk thresholds defined directly by the user or determined from the user's psychographic information, and/or other considerations.

In other words, the constraint framework defines how each particular objective may be "achieved," in various aspects. This may require, for example, a combination of a user altering his or her behavior and/or whether monetary allocations that result from this behavior are adequate to pay for one or more particular objectives. To provide an illustrative example with reference to FIGS. 4A-4B, an objective may be associated with a monetary value (e.g., the down payment associated with purchasing a new home, the average cost of dining out in the user's region based upon available data, the cost of property, life, and/or health insurance premiums, etc.). In such a case, the constraint framework may specify one or more monetary conditions such that each of these objectives is achieved when the user is able to allocate an amount of money equal to or greater than the monetary value by a date (if applicable) that is associated with that objective.

To provide another illustrative example, one or more of the objectives may be a "residency" objective that is associated with the user living within a primary region, zip code, city, etc. Continuing this example, the constraint framework may specify that this objective is achieved when a monthly budget (or other suitable source of available income) can be established by allocating an amount of money equal to or greater than an average monthly cost of living in the preferred primary region. This average monthly cost may be determined from any suitable data source, such as third party data sources (e.g., one or more of back-end components 120), for example. Further continuing this example, if the residency objective cannot be achieved in accordance with the constraint framework, the constraint framework may define alternatives that may be presented to the user, which are used to modify the user's current objectives such that the modified objectives may then be achieved. For instance, life script calculation engine 200 may calculate other regions that are nearest to the primary region for which the monthly budget can be established.

The determination of other regions (or other alternatives in general) may also be made in a manner that is specified by the constraint framework taking other objectives into consideration. For example, assume that the user has two objectives of equally high importance, one being to buy a house in 5 years and another indicating that living in the city is very important. In this scenario, if the user cannot achieve the objective of purchasing a home within the given time frame of 5 years, script calculation engine 200 may suggest a longer timeline or other alternate nearby (or the nearest) cities. However, if the user did not have another objective indicating the importance of living in the city, the life script calculation engine 200 could suggest other alternatives such as areas outside the city that may be more affordance, and thus achievable within the 5 year time frame. In this way, life script calculation engine 200 calculates a constraint framework for each user such that each user's individual objectives may be achieved in a customized manner that is optimized for each user.

In the present aspects, life script calculation module 235 is a portion of memory unit 226 configured to store instructions, that when executed by processor unit 222, cause processor unit 222 to perform various acts in accordance with applicable aspects as described herein. For example, instructions stored in life script calculation module 235 may facilitate processor unit 222 performing functions associated with calculating a life script in accordance with a user's constraint framework. This life script may be calculated to include, for example, user behavior, contributions, and allocations required to achieve one or more user-defined objectives in accordance with the constraint framework. For example, the life script may be generated that attempts to achieve each of the objectives in order of weighted importance as designated by the user. An example of how the constraint framework may be applied to a set of user objectives to determine a viable life script is further discussed below with reference to FIGS. 5A-5B.

Exemplary Constraint Framework Application

Figure 5A:
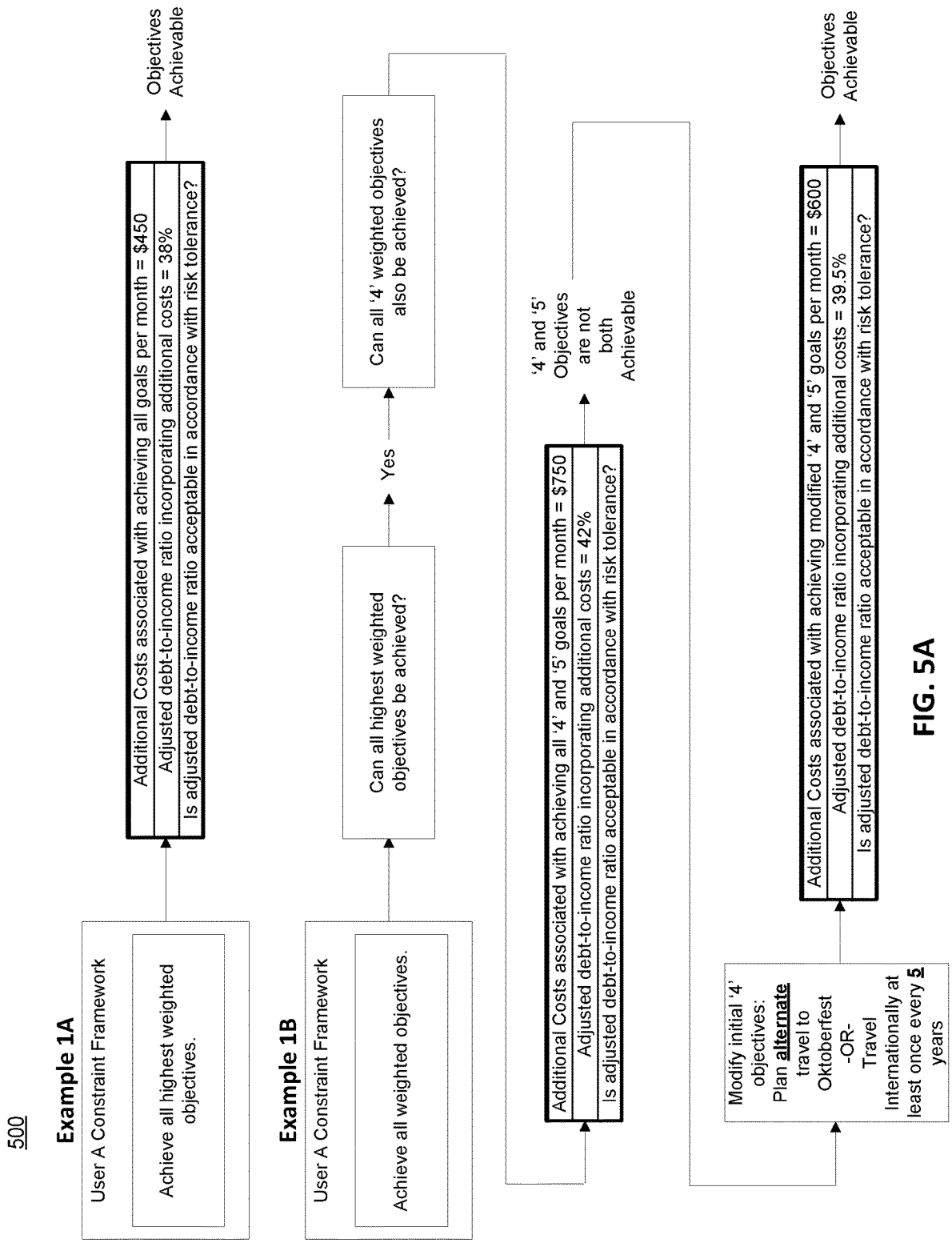
FIG. 5A illustrates two examples of applying a constraint framework to determine whether user-defined objectives are achievable for a user A, in accordance with aspects of the present disclosure.

FIG. 5A illustrates two examples of applying a constraint framework to determine whether user-defined objectives are achievable for User A, in accordance with aspects of the present disclosure. The objectives for User A in both examples 1 and 2 as shown in FIG. 5A correspond to the user-defined objectives 400, as shown in FIG. 4A. It should be noted that the example life script and constraint framework shown in FIGS. 5A-5B and discussed herein primarily rely on monetary values and monetary thresholds associated with a debt-to-income ratio metric. This is done for ease of explanation, and aspects include using any suitable combination of factors and/or metrics, monetary or otherwise, to generate a life script in accordance with a user's constraint framework.

As shown in Example 1A, the overall goal defined by the constraint framework is to attempt to achieve only the highest-weighted objectives, i.e., those indicated as being the most important by the user. To this end, the life script calculation engine 200 may monetize achieving each of these goals over a timeline as indicated by the user's defined objectives, if applicable. This monetized value is then factored over time such that the cost of achieving these objectives can be realized on a shorter timeline, such as a monthly budget, for example. In the example shown in Example 1A, this translates to requiring User A's to allocate an additional $450 per month to achieve these objectives, which corresponds to an adjusted debt-to-income (DTI) ratio of 38% when this additional allocation is considered as a debt payment.

Further continuing this example, the adjusted DTI ratio may or may not be acceptable to this particular user. The determination of whether this is acceptable may then be resolved by considering other factors defined in User A's constraint framework (e.g., User A's risk tolerance), which again may be determined from information associated with User A's profile. In this case, User A may have a risk tolerance such that this adjusted DTI ratio is acceptable, and thus each of User A's highest-weighted objectives may be achieved by setting aside an additional $450 a month in this scenario.

Figure 5B:
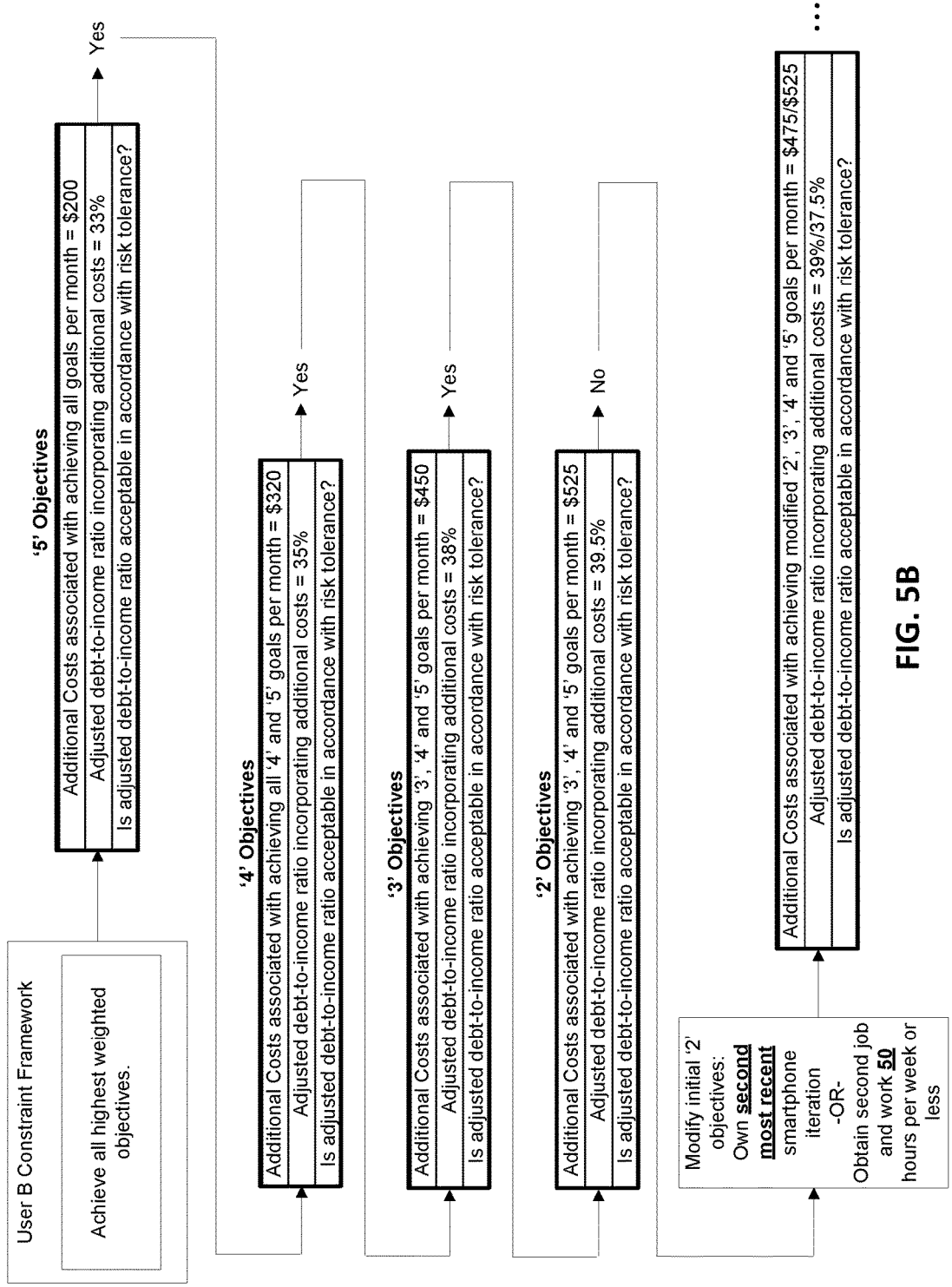
FIG. 5B illustrates an example of applying a constraint framework to determine whether user-defined objectives are achievable for a user B, in accordance with aspects of the present disclosure.

The examples discussed herein with reference to FIGS. 5A-5B capture a life script moving forward using data that is available at a particular point in time for ease of explanation. However, as discussed herein, the user's profile data may change over time based upon various factors such as having a baby, getting a promotion, or losing a job, each of which may influence the DTI ratio and the user's tolerance for risk. Therefore, aspects include the constraint framework, and the life script generated using the constraint framework, being dynamically updated over time to consider such changes.

For example, if the DTI ratio of 38% is right on the edge of the user's acceptable threshold tolerance, future scenarios that increase this DTI ratio (and/or decrease the user's acceptable threshold tolerance) may result in one or more objectives not being achievable because an objective no longer fits the requirements of the updated constraint framework. If this is the case, aspects include determining alternatives and/or transmitting a notification to the user (e.g., via client device 102) notifying the user of these alternatives. In this way, life script calculation engine 200 may actively monitor a user's progress towards various objectives and automatically adjust particular features of the constraint framework. For instance, life script calculation engine 200 may modify budgets, products, and/or user behavior to maximize the user's likelihood of accomplishing his objectives in a manner that may be weighted by probability of success and importance to the customer.

Moreover, the life script, upon being generated, may additionally or alternatively execute one or more actions to allow the user to achieve various objectives, when possible. For example, assume that one of the user's highest weighted objectives was to obtain life insurance because that user was planning to have a baby in the next two years. In such a case, the life script calculation engine 200 may actively identify one or more insurance companies that offer life insurance and obtain information that allows the user to immediately take action to achieve this objective.

To provide an illustrative example, the life script calculation engine 200 may obtain one or more Uniform Resource Locator (URL) links to respective insurers that offer life insurance, with each URL being a link to that insurer's online life insurance purchasing process. These links may be transmitted to the user (e.g., via client device 102) such that these links are displayed with other information provided by the life script such as alternative objectives, whether the objectives can be achieved, etc. In various aspects, life script calculation engine 200 may provide links, phone numbers, real estate listings, or any other suitable type of information to the user when this type of information is available for one or more achievable objectives. In this way, life script calculation engine 200 may execute parts of the life script that it is able to and allow the user to effectuate one or more actions in accordance with the life script.

Referring back to FIG. 5A, Example 1B indicates a constraint framework to achieve all weighted objectives defined by the user, as opposed to just the highest-weighted ones. As shown in Example 1B, this includes the life script calculation engine 200 generating a script that achieves each of the objectives in order of each objective's weighted importance, as specified by the constraint framework. However, it will be understood that any suitable order or processing of each of the objectives may be realized in accordance with various aspects of the present disclosure.

Similar to Example 1A, the Example 1B indicates life script calculation engine 200 monetizing each goal, and iteratively determining whether all objectives may be achieved at each level of weighted importance. For example, upon determining that all objectives with a '5' weighting can be achieved, life script calculation engine 200 may then move on to determine a monetary translation for further achieving all objectives with a '4' weighting. As shown in Example 1B, although all '5' weighted objectives can be achieved, the constraint framework does not allow for both '5' and '4' weighted objectives to be achieved together.

Therefore, aspects include life script calculation engine 200 modifying each of the '4' objectives until each one is achieved in accordance with the constraint framework. This modification may be performed in accordance with any suitable technique as indicated, for example, via the constraint framework. For example, life script calculation engine 200 may modify the objectives, as shown in Example 1B, such that objectives having a higher weighted importance are modified less than objectives with a lower weighted importance. In other words, each iterative step may make the minimal modification such that all objectives can be achieved, which may cause more aggressive modifications to progressively be made to lower-weighted objectives.

For example, the alternatives shown in Example 1B include the user traveling to an alternate destination that may cost less than the originally-planned trip. This alternate trip may, for example, cost an amount that brings the DTI ratio within an acceptable threshold of risk tolerance for User A. Another alternative may be associated with the user's recurring or longer-term goals. For instance, User A may need to decide between travelling internationally less frequently (i.e., every 5 years) that originally desired (i.e., every 3 years).

FIG. 5B illustrates an example of applying a constraint framework to determine whether user-defined objectives are achievable for a User B, in accordance with aspects of the present disclosure. The objectives for User B correspond to the user-defined objectives 450, as shown in FIG. 4B. As shown in FIG. 5B, the overall goal defined by the constraint framework is to attempt to achieve all objectives, similar to Example 1B as shown in FIG. 5A. Again, in this example the life script calculation engine 200 may monetize achieving each of these goals over a timeline as indicated by the user's defined objectives, if applicable, which is then factored over time such that the cost of achieving these objectives can be realized on a shorter timeline.

In the example shown in FIG. 5B, the result of User B achieving all objectives at a particular weighted value results in additional costs being allocated as part of User B's monthly budget. Thus, an adjusted debt-to-income (DTI) ratio is calculated at each iterative step until either (1) all user objectives are achieved and the resulting DTI ratio is within User B's acceptable risk tolerance threshold, or (2) User B's acceptable risk tolerance threshold is exceeded before achieving all objectives. As shown in FIG. 5B, the life script allows for User B to accomplish the '5', '4', and '3' weighted objectives, but these objectives cannot be achieved in addition to the '2' weighted objectives. That is, the '2' weighted objectives result in the adjusted DTI ratio being 39.5%, and it is assumed that this is in excess of User B's risk tolerance threshold of 39%.

Therefore, the alternatives shown in FIG. 5B include modifying the original '2' weighted objectives such that User B can instead own the second most recent iteration of a smartphone (instead of the most recent one), or get a second job and work 50 hours a week or less (instead of 40 hours or less). Satisfying either one of these conditions may bring the DTI ratio within an acceptable threshold of risk tolerance for User B (e.g., 39% and 37.5%, respectively). In various aspects, this process may be further repeated for the '1' weighted objectives, which is not shown in FIG. 5B for purposes of brevity. The decision of whether the '1' weighted objectives can be achieved may then be determined and, if not, additional alternatives may be generated and sent to the user. In this way, the life script calculation engine 200 may interact with a user to ensure the user's objectives are achieved in a manner that is most favorable to that particular user, i.e., by obtaining feedback from the user at each iterative step and guiding subsequent steps based upon this feedback.

Figure 6:
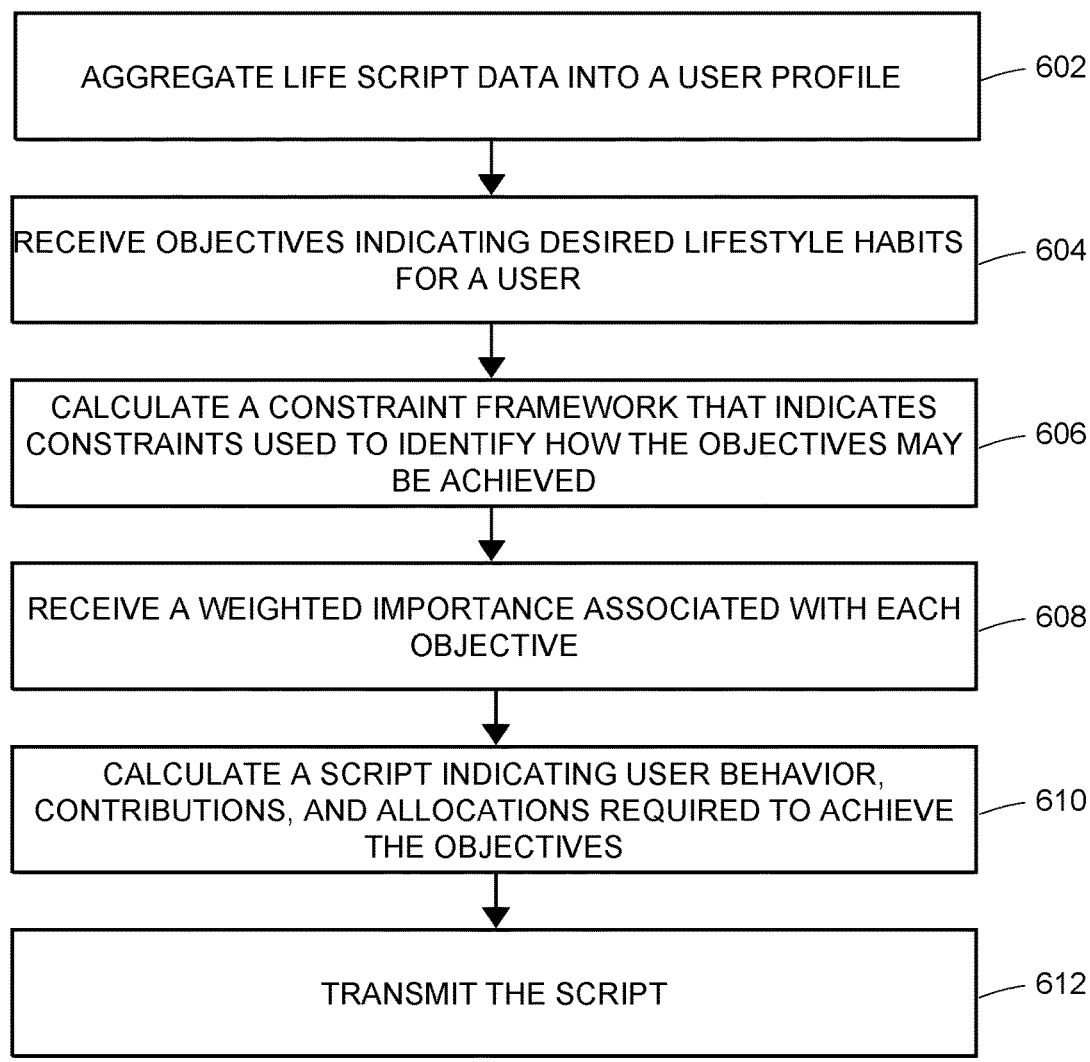
FIG. 6 illustrates an exemplary computer-implemented method flow 600, in accordance with aspects of the present disclosure.

Exemplary Computer-Implemented Method of Calculating and Transmitting a Life Script FIG. 6 illustrates a computer-implemented method flow 600, in accordance with aspects of the present disclosure. In the present aspects, one or more portions of method 600 (or the entire method 600) may be implemented by any suitable device, and one or more portions of method 600 may be performed by more than one suitable device in combination with one another. For example, one or more portions of method 600 may be performed by client device 102 and/or life script calculation engine 120.1, as shown in FIG. 1. In one aspect, method 600 may be performed by any suitable combination of one or more processors, instructions, applications, programs, algorithms, routines, etc. For example, method 600 may be performed via processor unit 222 executing instructions stored in memory unit 226, as shown in FIG. 2, in conjunction with data collected, received, and/or generated via one or more financial institutions (e.g., one or more financial institutions 150), one or more back-end computing devices (e.g., one or more back-end computing devices 120), and/or one or more client devices 102 (e.g., client device 102).

Method 600 may start when one or more processors aggregate life script data into a user profile (block 602). Again, this life script data may include any suitable type of data that is relevant to the calculation of a constraint framework that is subsequently used to calculate a life script (block 602). For example, the life script data may include financial information, demographic information, lifestyle information, and/or psychographic information associated with a user (block 602). In the present aspects, the life script data may be received from any suitable number and/or type of data sources. For example, the life script data may correspond to data collected via client device 102, one or more financial institutions 150, and/or one or more back-end computing devices 120, as shown and discussed with reference to FIG. 1.

Method 600 may include one or more processors receiving objectives indicating desired lifestyle habits for a user (block 604). For example, the objectives may be defined by a user in accordance with specifically directed survey questions, as discussed herein (block 604). These objectives may include, for example, any suitable type of recurring, current, or future goal, habit, etc., which may be driven by the user's current, expected, and preferred lifestyle habits or changes to those lifestyle habits that are likely or certain to occur within a known time frame, as discussed above with reference to FIGS. 4A-B (block 604).

Method 600 may include one or more processors calculating a constraint framework that indicates one or more constraints used to identify how to achieve the objectives (block 606). This may include, for example, determining an order in which the objectives are attempted to be achieved, alternatives, and/or the logic and conditions used to determine how each objective can be achieved (block 606). For example, this may include translating each objective into a monetary value, allocating budgets based upon data that is available from the user's profile, and/or determining alternate objectives in accordance with the user's profile and/or other objectives, as discussed herein (block 606).

Method 600 may include one or more processors receiving a weighted importance associated with each objective (block 608). This may include, for example, assigning a weight associated with the importance of each objective as indicated by the user. In one aspect, the weighted importance may be indicated by the user and sent with the objectives received (block 604) in accordance with survey questions, as discussed herein (block 608).

Method 600 may include one or more processors calculating a script that indicates user behavior, contributions, and allocations required to achieve one or more of the plurality of objectives (block 610). This may include, for example applying alternatives as indicated by the constraint framework and/or approved by the user (block 610). This may also include, for example, applying the various logic and conditions represented by the constraint framework to the objectives in order of weighted importance, as discussed herein with reference to FIGS. 5A-5B (block 610).

Method 600 may include one or more processors transmitting the life script to a user (block 612). This may include, for example, transmitting a notification to a client device associated with the user indicating the details of the life script, which is then displayed via the client device (block 612). This may also include, for example, transmitting one or more action items to the user's client device in the form of one or more interactive user-selectable links, which, when selected by the user, facilitate the user effectuating an action in accordance with the script, as discussed above with reference to FIGS. 5A-5B (block 612).

Technical Advantages

The aspects described herein may be implemented as part of one or more computer components such as a client device and/or one or more back-end components, such as a life script calculation engine 120.1 and/or life script calculation engine 200, for example. Furthermore, the aspects described herein may be implemented as part of a computer network architecture that facilitates communications between various other devices and/or components. Thus, the aspects described herein address and solve issues of a technical nature that are necessarily rooted in computer technology.

For instance, aspects include analyzing various sources of data to generate a user profile and to calculate a constraint framework in accordance with user-specified objectives. In doing so, the aspects overcome issues associated with the inconvenience of manual and/or unnecessary monitoring of such data by anticipating future needs and determine a holistic life script that considers other available alternatives in conjunction with how important specific objectives are to specific users. Without the improvements suggested herein, additional time, processing resources, and memory usage would be required to achieve these results.

Furthermore, the embodiments described herein function to analyze data sources over time, to update a user's profile based upon an aggregation of this data, and to dynamically update the user's life script. As a result, the process improves upon existing technologies by more accurately forecasting and anticipating a user's needs and/or concurrently analyzing data from a larger number of sources than would be feasible or practical. As a result, the customization of a life script improves upon the speed, efficiency, and accuracy in which such calculations could otherwise be performed. Due to these improvements, the aspects address computer-related issues regarding efficiency over the traditional amount of processing power and models used to calculate budgets, determine whether certain objectives can be achieved, and/or determining viable alternatives.

Thus, the aspects also improve upon computer technology by requiring fewer calculations due to the increased efficiency provided, for example, via the combination of processes, steps, elements, and/or components described herein. In other words, the specific combination of elements and/or components working in conjunction with one another (e.g., via networked communications) in and of itself represent a significant improvement to the overall technology involved. To be sure, the applications described herein produce a tangible improvement over conventional utilities, which are narrow-focused and fail to provide a comprehensive life planning solution for users.

Exemplary Computer-Implemented Method for Implementing a Comprehensive Life Planner In one aspect, a computer-implemented method for implementing a comprehensive life planner may be provided. The method may include one or more processors (and/or associated transceivers) (1) aggregating financial information, demographic information, lifestyle information, and psychographic information associated with a user to generate a user profile; (2) receiving a plurality of objectives indicating desired recurring lifestyle habits as identified by the user; (3) calculating a constraint framework for the user in accordance with the user profile that indicates one or more constraints used to identify how to achieve the plurality of objectives; (4) receiving a weighted importance associated with each of the plurality of objectives, the weighted importance indicating how important it is for the user to achieve each of the plurality of objectives compared to the others; (5) calculating a script that indicates user behavior, contributions, and allocations required to achieve one or more of the plurality of objectives, in order of weighted importance, in accordance with the constraint framework; and/or (6) transmitting (such as via wireless communication or data transmission over one or more radio frequency links or communication channels) the script to an electronic or mobile device for presentation to the users. The method may include additional, less, or alternate actions, including those discussed elsewhere herein.

For instance, in various aspects, an objective may be associated with a monetary value, and is achieved when the user allocates an amount of money equal to or greater than the monetary value by a date associated with the objective.

Additionally or alternatively, when each of the plurality of objectives cannot be achieved by the user, the method may include modifying the plurality of objectives until each one is achieved in accordance with the constraint framework such that objectives having a higher weighted importance are modified less than objectives with a lower weighted importance.

The objective may also include a residency objective associated with a the user living within a primary region, and is achieved when a monthly budget is established in accordance with the constraint framework by allocating an amount of money equal to or greater than an average monthly cost of living in the primary region. When the residency objective cannot be achieved in accordance with the constraint framework, the method may further include calculating other regions nearest to the primary region for which the monthly budget can be established in accordance with the constraint framework Furthermore, the financial information may include data identifying monthly income and expenses, whereas the psychographic information may include data identifying a maximum level of user risk user.

Additionally or alternatively, transmitting the script may include transmitting data identifying user-selectable links, which are then displayed on the electronic device for presentation to the user. These user-selectable links, when selected by the user, facilitate the user immediately effectuating an action in accordance with the script.

Exemplary System for Implementing a Comprehensive Life Planner

In yet another aspect, a computer system for predicting when a user requires a loan and presenting the user with a loan offer may be provided. The system may include (1) one or more back-end components, which may be configured to (i) aggregate financial information, demographic information, lifestyle information, and psychographic information associated with a user to generate a user profile; (ii) receive a plurality of objectives indicating desired lifestyle habits as identified by the user; (iii) calculate a constraint framework for the user in accordance with the user profile that indicates one or more constraints used to identify how to achieve the plurality of objectives; (iv) receive a weighted importance associated with each of the plurality of objectives, the weighted importance indicating how important it is for the user to achieve each of the plurality of objectives compared to the others; (v) calculate a script that indicates user behavior, contributions, and allocations required to achieve one or more of the plurality of objectives, in order of weighted importance, in accordance with the constraint framework; and/or (vi) transmit the script to an electronic device for presentation to the users. The system may also include (2) a client device configured to receive the script transmitted by the one or more back-end components and to display the script to the user. The system may include additional, less, or alternate components, including those discussed elsewhere herein.

For instance, in various aspects, an objective may be associated with a monetary value, and is achieved when the user allocates an amount of money equal to or greater than the monetary value by a date associated with the objective.

Additionally or alternatively, when each of the plurality of objectives cannot be achieved by the user, the one or more back-end components may be further configured to modify the plurality of objectives until each one is achieved in accordance with the constraint framework such that objectives having a higher weighted importance are modified less than objectives with a lower weighted importance.

The objective may also include a residency objective associated with a the user living within a primary region, and is achieved when a monthly budget is established in accordance with the constraint framework by allocating an amount of money equal to or greater than an average monthly cost of living in the primary region. When the residency objective cannot be achieved in accordance with the constraint framework, the one or more back-end components may be further configured to calculate other regions nearest to the primary region for which the monthly budget can be established in accordance with the constraint framework Furthermore, the financial information may include data identifying monthly income and expenses, whereas the psychographic information may include data identifying a maximum level of user risk.

Additionally or alternatively, the one or more back-end components may be further configured to transmit the script to include data identifying user-selectable links, which are then displayed on the client device for presentation to the user. The client device may also be further configured to communicate with the one or more back-end components such that, when one of the user-selectable links is selected by the user, it facilitates the user immediately effectuating an action in accordance with the script.

Exemplary Non-Transitory Computer Readable Medium for Implementing a Comprehensive Life Planner Still further, a non-transitory computer readable medium may be provided having instructions stored thereon that, when executed by one or more processors, cause the one or more processors to: (1) aggregate financial information, demographic information, lifestyle information, and psychographic information associated with a user to generate a user profile; (2) receive a plurality of objectives indicating desired lifestyle habits as identified by the user; (3) calculate a constraint framework for the user in accordance with the user profile that indicates one or more constraints used to identify how to achieve the plurality of objectives; (4) receive a weighted importance associated with each of the plurality of objectives, the weighted importance indicating how important it is for the user to achieve each of the plurality of objectives compared to the others; (5) calculate a script that indicates user behavior, contributions, and allocations required to achieve one or more of the plurality of objectives, in order of weighted importance, in accordance with the constraint framework; and/or (6) transmit the script to an electronic device for presentation to the users. The non-transitory computer readable medium may also include additional, less, or alternate instructions, including those discussed elsewhere herein.

For instance, in various aspects, an objective may be associated with a monetary value, and is achieved when the user allocates an amount of money equal to or greater than the monetary value by a date associated with the objective.

Additionally or alternatively, when each of the plurality of objectives cannot be achieved by the user, the instructions may facilitate the one or more processors modifying the plurality of objectives until each one is achieved in accordance with the constraint framework such that objectives having a higher weighted importance are modified less than objectives with a lower weighted importance.

The objective may also include a residency objective associated with a the user living within a primary region, and is achieved when a monthly budget is established in accordance with the constraint framework by allocating an amount of money equal to or greater than an average monthly cost of living in the primary region. When the residency objective cannot be achieved in accordance with the constraint framework, the instructions may facilitate the one or more processors calculating other regions nearest to the primary region for which the monthly budget can be established in accordance with the constraint framework Furthermore, the financial information may include data identifying monthly income and expenses, whereas the psychographic information may include data identifying a maximum level of user risk user.

Additionally or alternatively, the instructions may facilitate the one or more processors transmitting the script to include data identifying user-selectable links, which are then displayed on an electronic device for presentation to the user. The electronic device may also be further configured to communicate with the one or more back-end components such that, when one of the user-selectable links is selected by the user, it facilitates the user immediately effectuating an action in accordance with the script.

Additional Considerations

As discussed herein, data may be collected from various sourced to generate, update, and/or modify a user profile to accurately calculate life scripts. As described herein, the collection of data may be performed after the user provides their affirmative consent, in some aspects.

This detailed description is to be construed as exemplary only and does not describe every possible embodiment, as describing every possible embodiment would be impractical, if not impossible. One may be implement numerous alternate embodiments, using either current technology or technology developed after the filing date of this application.

Furthermore, although the present disclosure sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some exemplary embodiments, the one or more processors or processor-implemented modules may be located in a single geographic location (e.g., within a vehicle, within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

The various systems and methods described herein are directed to an improvement to computer functionality, and improve the functioning of conventional computers, as described, for example, in the "Technical Advantages" Section and elsewhere herein.

What is claimed is:

1. A method implemented by one or more processors, the method comprising:
   receiving, by the one or more processors, information associated with a user from a plurality of data sources, the information including financial information received from a first data source, demographic information received from a second data source, psychographic information received from a third data source, and lifestyle information received from a fourth data source;
   aggregating, by the one or more processors, the information associated with the user;
   receiving a plurality of objectives and a weighted importance associated with each objective of the plurality of objectives, the plurality of objectives indicating a plurality of desired lifestyle goals of the user;

translating, by the one or more processors, each objective of the plurality of objectives into a respective metric;

generating, by the one or more processors, for each objective of the plurality of objectives based at least in part upon the aggregated information, one or more combinations of user behaviors associated with the respective metric; and generating a script for implementing the plurality of objectives, the script indicating:
    the plurality of objectives in order of the corresponding weighted importance; and
    for each objective of the plurality of objectives, the one or more combinations of user behaviors.

2. The method of claim 1, wherein each objective of the plurality of objectives is achieved when the user meets or exceeds the one or more combinations of user behaviors prior to a date specified for each objective.

3. The method of claim 1, further comprising:
determining at least one objective of the plurality of objectives cannot be achieved in accordance with a constraint framework associated with a profile of the user and the plurality of objectives; and
in response to the determination, modifying the plurality of objectives until each objective is achieved in accordance with the constraint framework such that an objective having a higher weighted importance is modified less than an objective with a lower weighted importance.

4. The method of claim 3, wherein an objective of the plurality of objectives is a residency objective associated with the user living within a primary region, the residency objective is achieved when a monthly budget is established in accordance with the constraint framework and includes allocating an amount of money equal to or greater than an average monthly cost of living in the primary region.

5. The method of claim 4, further comprising:
determining the residency objective cannot be achieved in accordance with the constraint framework, and
in response to the determination, calculating other regions nearest to the primary region for which the monthly budget can be established in accordance with the constraint framework.

6. The method of claim 1, wherein:
the financial information include data identifying monthly income and expenses, and
the psychographic information include data identifying a maximum level of user risk.

7. The method of claim 1, further comprising:
transmitting, by the one or more processors to a client device associated with the user, data identifying one or more action items associated with implementing the plurality of objectives according to the script, the one or more action items being associated with the one or more combinations of user behaviors.

8. The method of claim 7, wherein transmitting the data identifying the one or more action items includes transmitting one or more user-selectable links that, when selected by the user via the client device, enables the user to immediately effectuate one or more actions to implement one or more objectives in accordance with the script.

9. A system comprising:
one or more memories storing program instructions;
one or more processors executing the program instructions and configured to:

receive information associated with a user from a plurality of data sources, the information including financial information received from a first data source, demographic information received from a second data source, psychographic information received from a third data source, and lifestyle information received from a fourth data source;

aggregate the information associated with the user;

receive a plurality of objectives and a weighted importance associated with each objective of the plurality of objectives, the plurality of objectives indicating a plurality of desired lifestyle goals of the user;

translate each objective of the plurality of objectives into a respective metric;

generate, for each objective of the plurality of objectives based at least in part upon the aggregated information, one or more combinations of user behaviors associated with the respective metric; and generate a script for implementing the plurality of objectives, the script indicating:
    the plurality of objectives in order of the corresponding weighted importance; and
    for each objective of the plurality of objectives, the one or more combinations of user behaviors.

10. The system of claim 9, wherein each objective of the plurality of objectives is achieved when the user meets or exceeds the one or more combinations of user behaviors prior to a date specified for each objective.

11. The system of claim 9, wherein the one or more processors are further configured to:
determine at least one objective of the plurality of objectives cannot be achieved in accordance with a constraint framework associated with a profile of the user and the plurality of objectives, and
in response to the determination, modify the plurality of objectives until each objective is achieved in accordance with the constraint framework such that an objective having a higher weighted importance is modified less than an objective with a lower weighted importance.

12. The system of claim 11, wherein:
an objective of the plurality of objectives is a residency objective associated with the user living within a primary region, the residency objective is achieved when a monthly budget is established in accordance with the constraint framework and includes allocating an amount of money equal to or greater than an average monthly cost of living in the primary region;
wherein the one or more processors are further configured to:
determine the residency objective cannot be achieved in accordance with the constraint framework, and
in response to the determination, calculate other regions nearest to the primary region for which the monthly budget can be established in accordance with the constraint framework.

13. The system of claim 9, wherein:
the financial information include data identifying monthly income and expenses, and
the psychographic information include data identifying a maximum level of user risk.

14. The system of claim 9, wherein the one or more processors are further configured to:
transmit, to a client device associated with the user, data identifying one or more action items associated with implementing the plurality of objectives according to the script, the one or more action items being associated with the one or more combinations of user behaviors.

15. A non-transitory computer readable medium having instructions stored thereon that, when executed by one or more processors, cause the one or more processors to:
   receive information associated with a user from a plurality of data sources, the information including financial information received from a first data source, demographic information received from a second data source, psychographic information received from a third data source, and lifestyle information received from a fourth data source;
   aggregate the information associated with the user;
   receive a plurality of objectives and a weighted importance associated with each objective of the plurality of objectives, the plurality of objectives indicating a plurality of desired lifestyle goals of the user;
   generate, for each objective of the plurality of objectives based at least in part upon the aggregated information, one or more combinations of user behaviors associated with the respective metric; and
   generate a script for implementing the plurality of objectives, the script indicating:
      the plurality of objectives in order of the corresponding weighted importance; and
      for each objective of the plurality of objectives, the one or more combinations of user behaviors.

16. The non-transitory computer readable medium of claim 15, wherein each objective of the plurality of objectives is achieved when the user meets or exceeds the one or more combinations of user behaviors prior to a date specified for each objective.

17. The non-transitory computer readable medium of claim 15, further including instructions that, when executed by the one or more processors, cause the one or more processors to:
   determine at least on objective of the plurality of objectives cannot be achieved in accordance with a constraint framework, and
   in response to the determination, modify the plurality of objectives until each objective is achieved in accordance with the constraint framework such that an objective having a higher weighted importance is modified less than an objective with a lower weighted importance.

18. The non-transitory computer readable medium of claim 17, wherein an objective of the plurality of objectives is a residency objective associated with the user living within a primary region, the residency objective is achieved when a monthly budget is established in accordance with the constraint framework and includes allocating an amount of money equal to or greater than an average monthly cost of living in the primary region.

19. The non-transitory computer readable medium of claim 18, further including instructions that, when executed by the one or more processors, cause the one or more processors to:
   determine the residency objective cannot be achieved in accordance with the constraint framework, and
   in response to the determination, calculate other regions nearest to the primary region for which the monthly budget can be established in accordance with the constraint framework.

20. The non-transitory computer readable medium of claim 15, wherein:
   the financial information include data identifying monthly income and expenses, and
   the psychographic information include data identifying a maximum level of user risk.

\* \* \* \* \*